Figure 1:
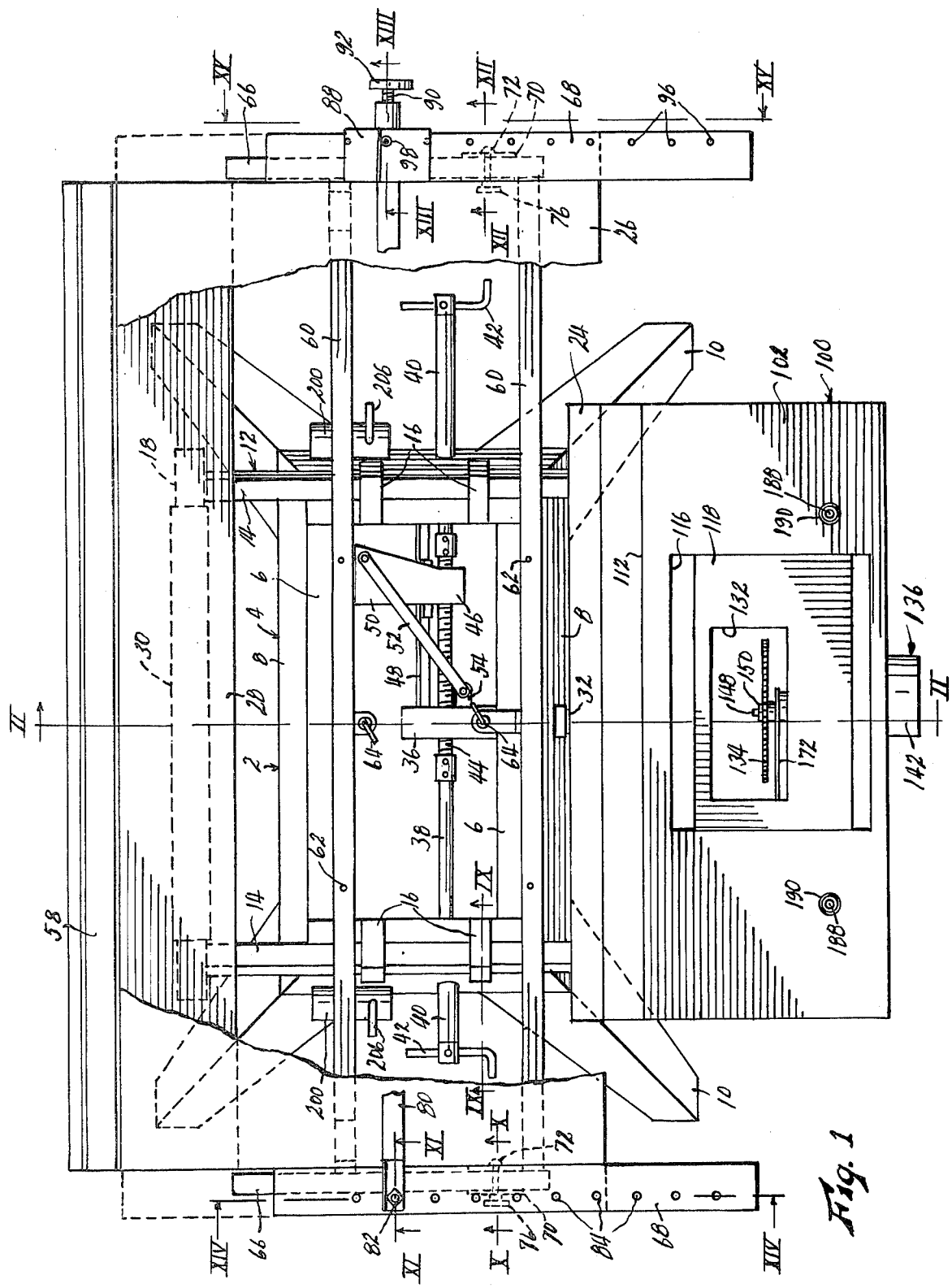

United States Patent [19]

Bassett

[11] 4,209,045
[45] Jun. 24, 1980

[54] COMBINATION TABLE SAW

[76] Inventor: Alvin L. Bassett, 2148 SE. 135th St., Portland, Oreg. 97233

[21] Appl. No.: 913,399

[22] Filed: Jun. 7, 1978

[51] Int. Cl.² .............................................. B27C 9/02
[52] U.S. Cl. ...................................... 144/1 G; 83/574;
  108/11; 108/90; 108/143; 144/286 R; 144/287;
  269/203
[58] Field of Search .............. 83/574, 477.2; 144/1 R,
  144/1 C, 1 G, 3 R, 285, 286 R, 286 A, 287, 288
  R; 108/11, 13, 15, 90, 137, 143; 269/203, 240

[56] References Cited

U.S. PATENT DOCUMENTS

| | | | |
|---|---|---|---|
| 1,140,243 | 5/1915 | Brimhall | 144/287 |
| 1,188,015 | 6/1916 | Sawyer | 144/287 |
| 2,599,096 | 6/1952 | Dirksen | 144/286 R |
| 2,759,507 | 8/1956 | Davis et al. | 108/15 X |
| 2,786,500 | 3/1957 | Unterfranz | 144/285 |
| 3,841,619 | 10/1974 | Hickman | 144/286 A |
| 4,062,390 | 12/1977 | Beekenkamp | 144/286 R |

FOREIGN PATENT DOCUMENTS 2237817  3/1973  Fed. Rep. of Germany ........... 144/287

Primary Examiner—Robert Louis Spruill
Assistant Examiner—W. D. Bray
Attorney, Agent, or Firm—John A. Hamilton

[57] ABSTRACT

A combination tool including a table base, a carriage mounted on the base and having a screw jack for moving it forwardly and rearwardly relative to the base, a main table top carried by and movable with the carriage, and an auxiliary table unit having a planar surface through which the blade of a power saw projects. The auxiliary table may be mounted on the carriage in a first position, in which the auxiliary table surface forms an extension of the main table for conjointly supporting work pieces to be moved in cutting relation to the saw blade, with the screw jack functioning to adjust the spacing bewtween the saw blade and a fence carried fixedly by the base, and a second position in which the auxiliary table surface is disposed vertically at an edge of the main table top and the projecting saw blade overlies the main table surface for grooving, edging or shaping the edge of a work piece supported on the main table. The saw blade may also be adjustable laterally of its plane in the auxiliary table to vary its elevation above the main table top. Also, cooperating vise jaws may be mounted respectively on the carriage and on the table base, the carriage-mounted jaw being movable toward and from the base-mounted jaw by the screw jack.

11 Claims, 22 Drawing Figures

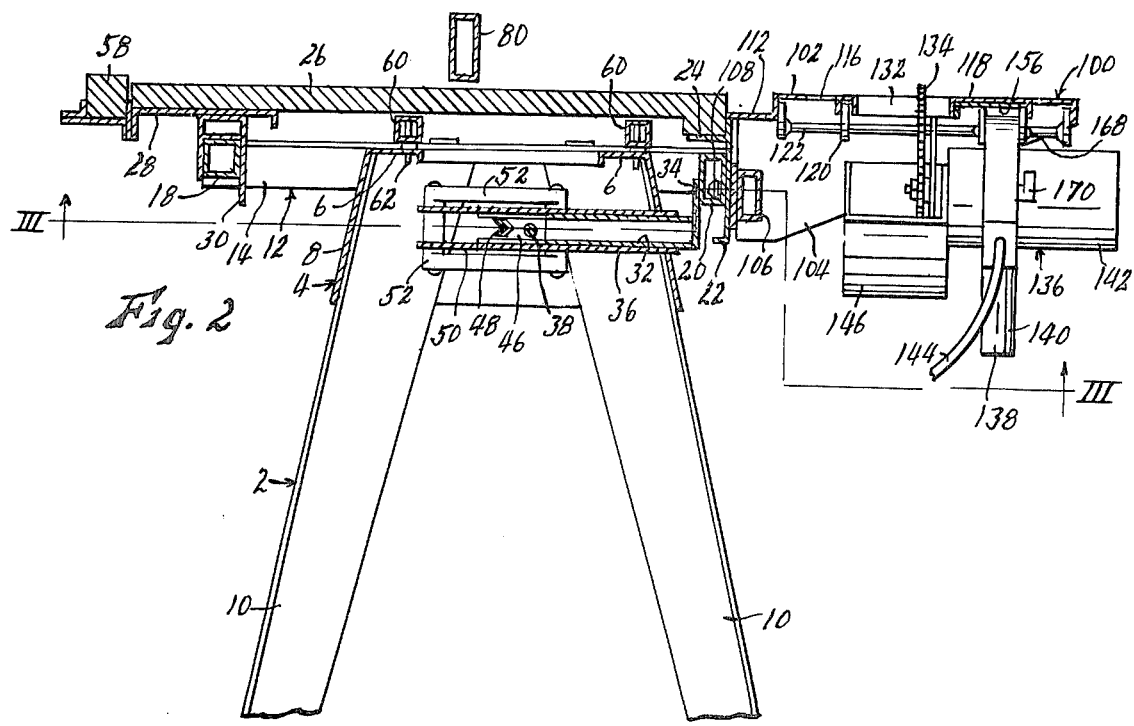
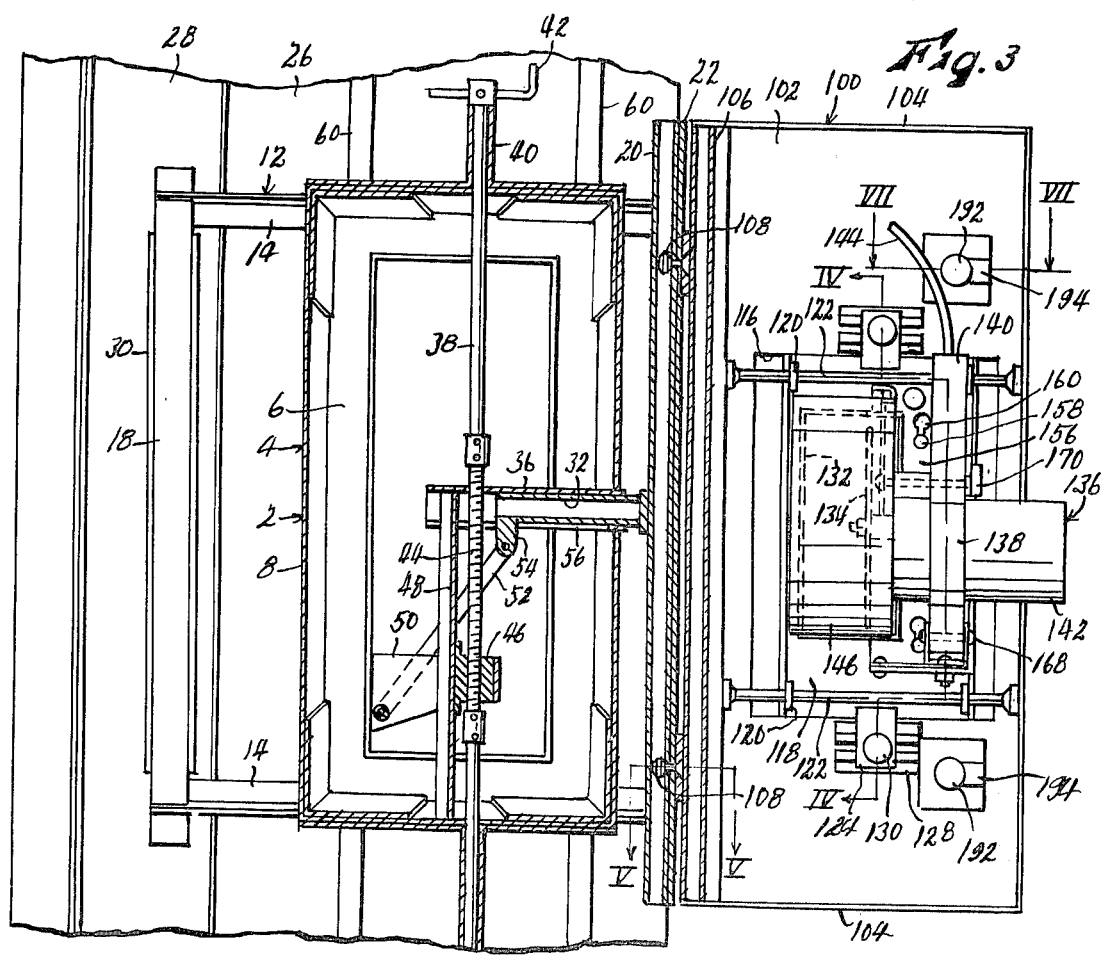

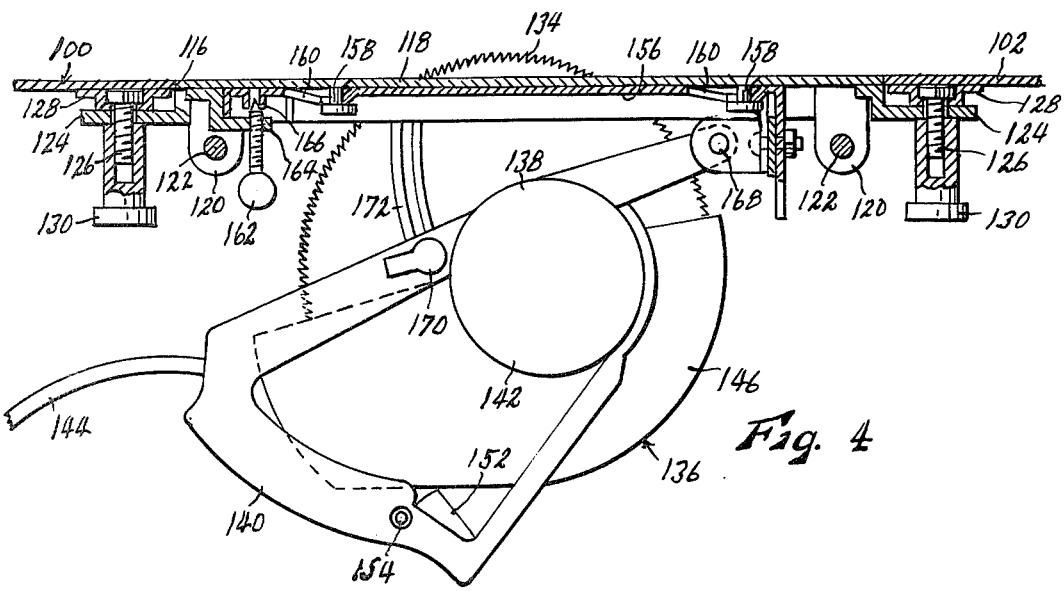
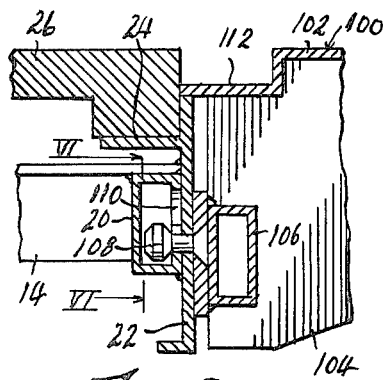
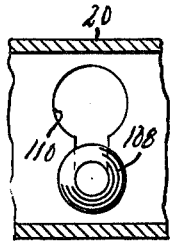
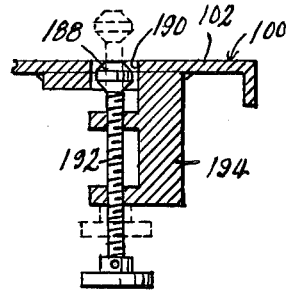
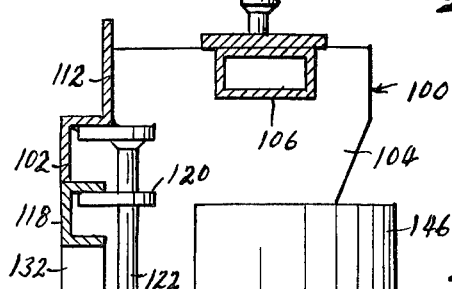
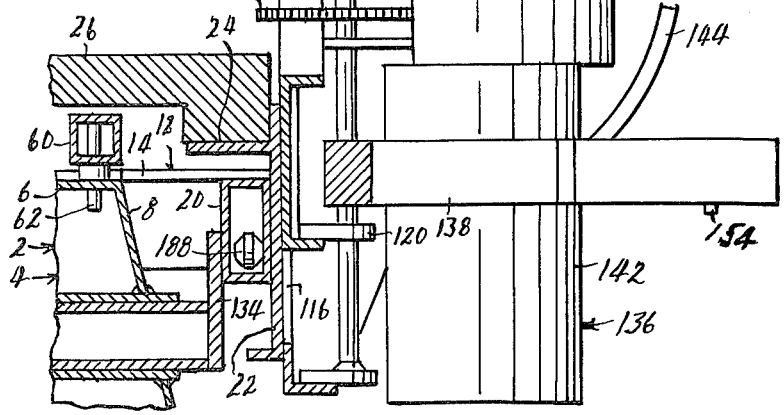

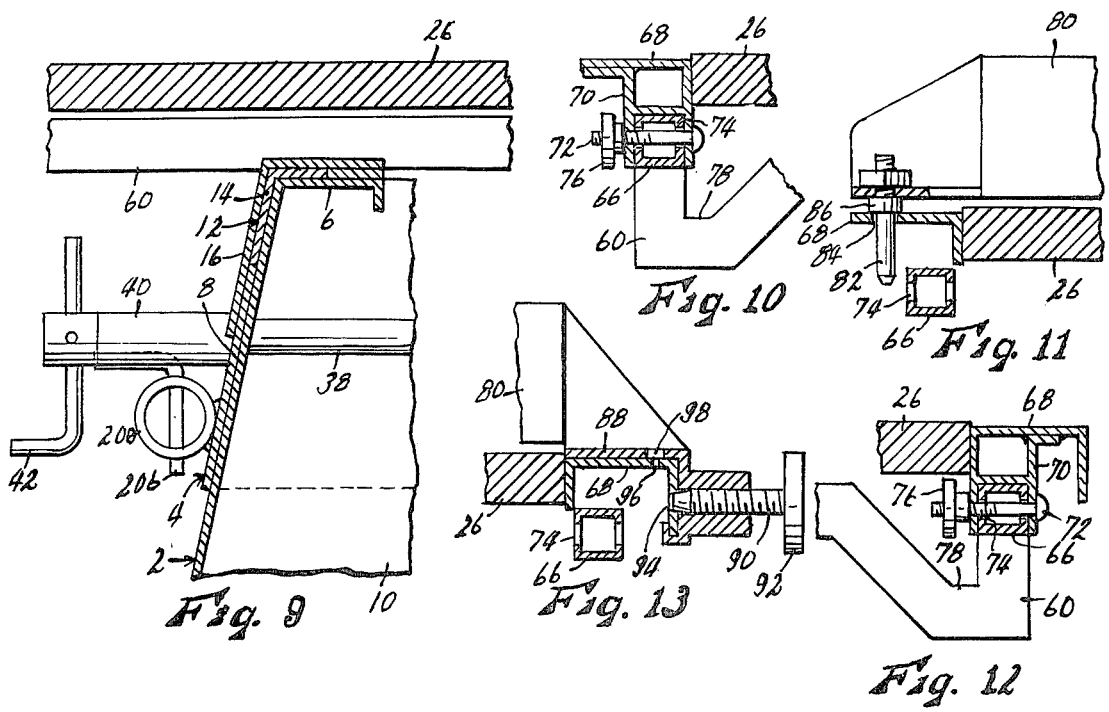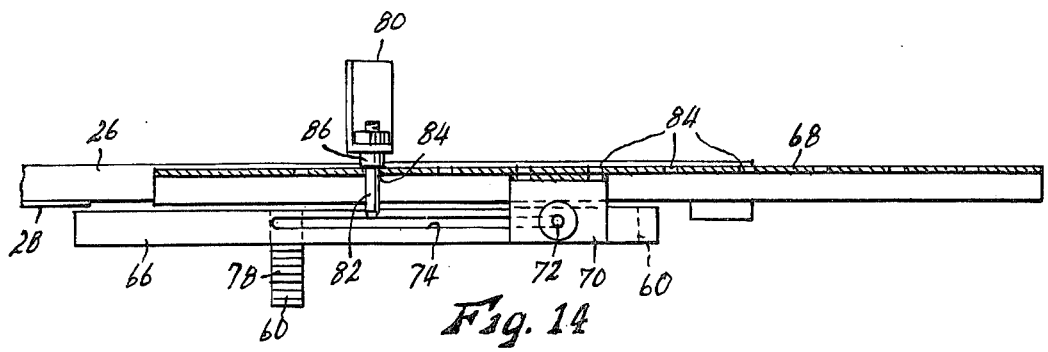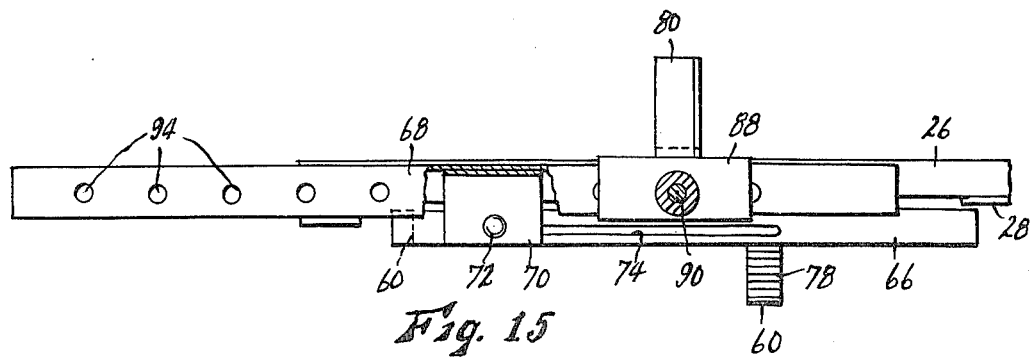

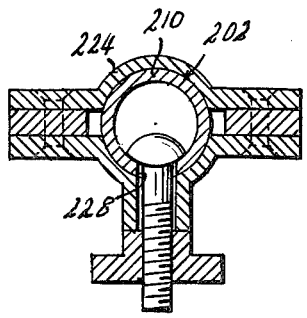
Fig. 18
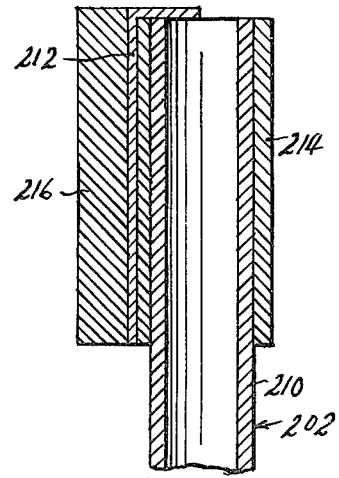
Fig. 19
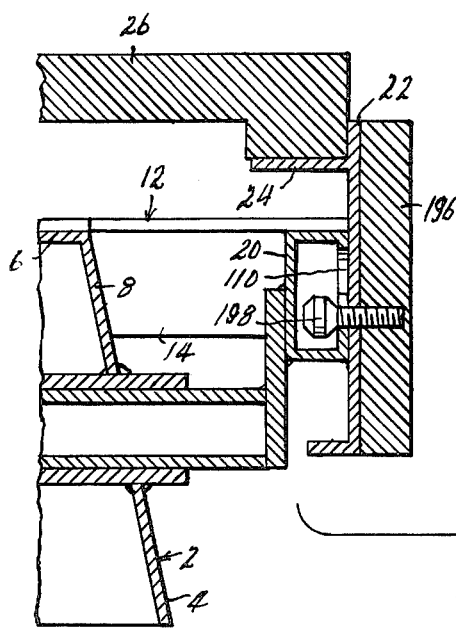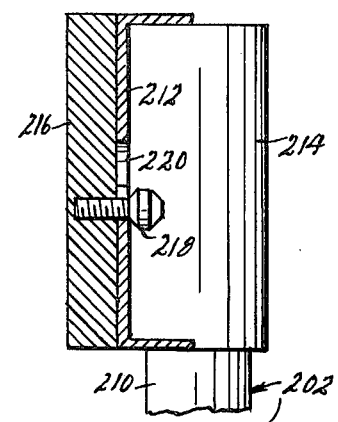
Fig. 20
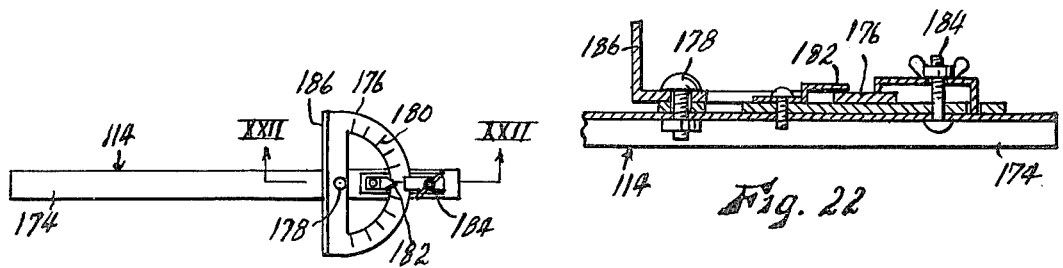
Fig. 21
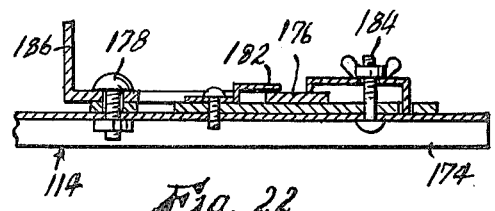
Fig. 22

COMBINATION TABLE SAW

This invention relates to new and useful improvements in shop tools, and has particular reference to a shop tool having a variety of alternative uses, such as use as a table saw, or as a shaper, or as a vise.

A primary object of the present invention is the provision of a tool which may be used alternatively either as a table saw of a class in which a saw blade projects upwardly through an aperture of a table over which a work piece such as a board is moved, or as a shaper which is capable of edging, grooving or otherwise shaping an edge of a board or other work piece supported on a table. Generally, this object is accomplished by the provision of a table base supporting a main table top, and an auxiliary table having an apertured planar surface through which the blade of a power saw mounted thereon projects. Many other rotary tools, such as edgers, groovers and shaping tools, may be mounted on and driven by the power saw. The auxiliary table may be mounted on the main table either in a first position in which its planar surface forms a coplanar extension of the main table to cooperate therewith in supporting a work piece, or in a second position in which its planar surface rises vertically from an edge of the main table with the blade overhanging the main table.

Another object is the provision of a device of the character described with the addition of means for adjusting the tables and saw relative to a work-guiding fence carried fixedly by the table base and extending parallel to the direction of work movement over the saw, whereby to adjust the saw for work pieces of different widths. This is accomplished by interposing a carriage between the table base and the main table top, supporting the main table top and in turn supported on the table base for movement transverse to said fence by a screw jack or the like.

A further object is the provision of a device of the character described wherein the power saw is adjustably mounted in the auxiliary table for movement in a direction transverse to the edge of the main table to which said auxiliary table is connected in the use of the device as a shaper, whereby to adjust the elevation of the blade relative to the main table.

A still further object is the provision of a device of the character described having alternative use as a vise. This object is accomplished by affixing a pair of confronting jaws respectively to the carriage above referred to, and to brackets attachable to the table base, and using the screw jack also above referred to move the carriage-mounted vise jaw.

Other objects are simplicity and economy of structure as compared to comparable devices, dependability and efficiency of operation, and adaptability for rapid and easy disassembly for easy transportation.

Figure 16:
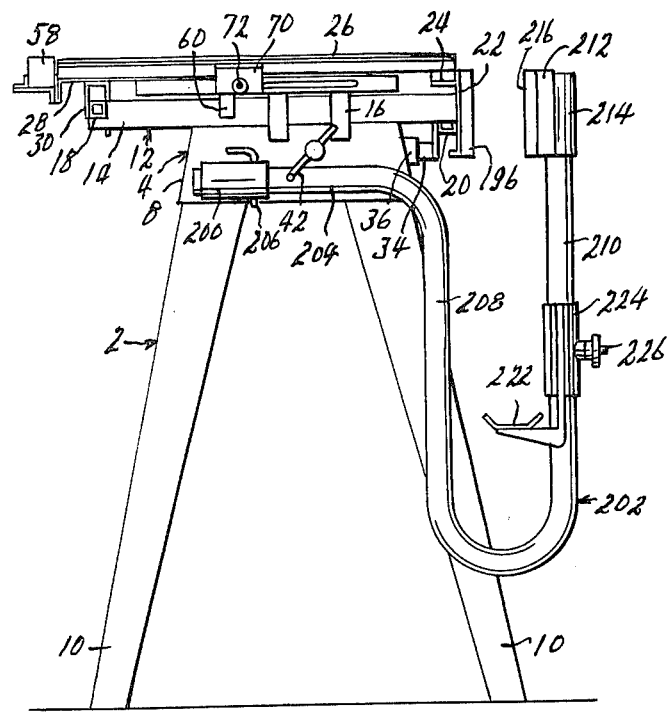
Figure 17:
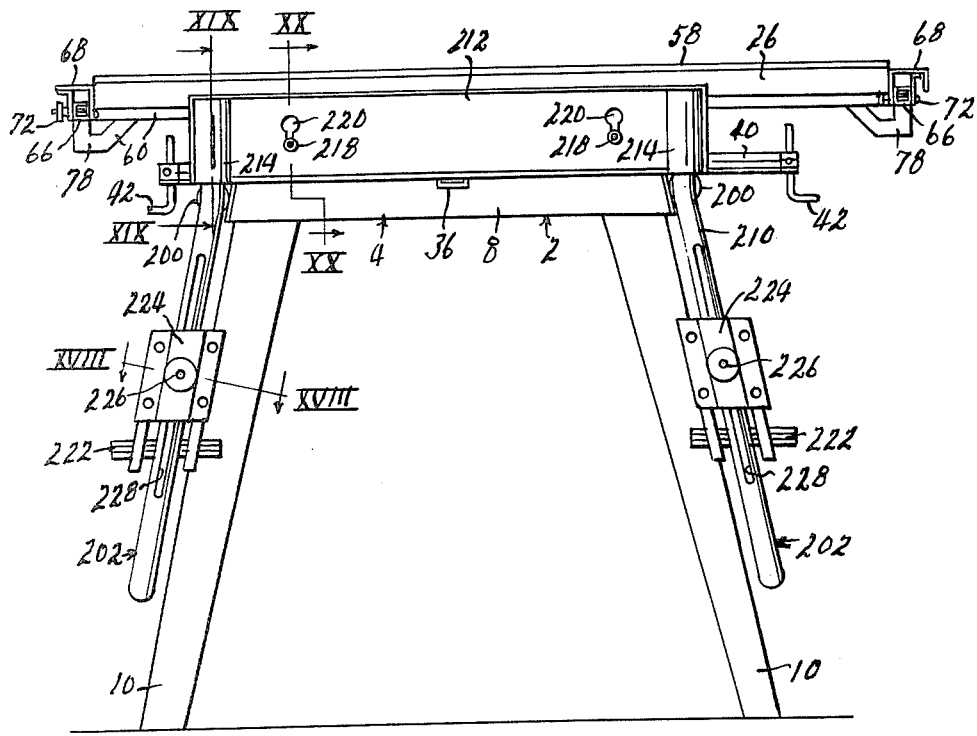

With these objects in view, as well as other objects which will appear in the course of the specification, reference will be had to the accompanying drawing, wherein:

FIG. 1 is a top plan view of a device embodying the present invention, set up for use as a table saw, with elements thereof broken away, FIG. 2 is a fragmentary sectional view, with portions left in elevation, taken on line II—II of FIG. 1, FIG. 3 is a fragmentary sectional view, with portions left in elevation, taken on line III—III of FIG. 2, FIG. 4 is an enlarged, fragmentary sectional view, with portions left in elevation, taken on line IV—IV of FIG. 3, FIG. 5 is an enlarged, fragmentary sectional view taken on line V—V of FIG. 3, FIG. 6 is an enlarged, fragmentary sectional view taken on line VI—VI of FIG. 5, FIG. 7 is an enlarged, fragmentary sectional view taken on line VII—VII of FIG. 3, showing a mounting lug retracted in solid lines and extended for use in dotted lines, FIG. 8 is an enlarged, fragmentary view similar to FIG. 2, but showing the device set up for use as a shaper, FIG. 9 is an enlarged, fragmentary sectional view taken on line IX—IX of FIG. 1, FIG. 10 is an enlarged, fragmentary sectional view taken on line X—X of FIG. 1, FIG. 11 is an enlarged, fragmentary sectional view taken on line XI—XI of FIG. 1, FIG. 12 is an enlarged, fragmentary sectional view taken on line XII—XII of FIG. 1, FIG. 13 is an enlarged, fragmentary sectional view taken on line XIII—XIII of FIG. 1, FIG. 14 is an enlarged, fragmentary sectional view taken on line XIV—XIV of FIG. 1, FIG. 15 is an enlarged, fragmentary sectional view taken on line XV—XV of FIG. 1, FIG. 16 is a side elevational view of the device set up for use as a vise, FIG. 17 is a front elevational view of the device as shown in FIG. 16, FIG. 18 is an enlarged sectional view taken on line XVIII—XVIII of FIG. 17, FIG. 19 is an enlarged, fragmentary sectional view taken on line XIX—XIX of FIG. 17, FIG. 20 is an irregular enlarged, fragmentary sectional view taken on line XX—XX of FIG. 17, FIG. 21 is a top plan view of a protractor for use with the device when it is set up for use as a table saw, and FIG. 22 is an enlarged, fragmentary sectional view taken on line XXII—XXII of FIG. 21.

Like reference numerals apply to similar parts throughout the several views, and the numeral 2 applies generally to the table base of the device. Said table base includes a horizontally rectangular frame 4 which is wider from side-to-side than from front to rear, having four permanently joined sides each consisting of an upper horizontal lip 6 and an outwardly and downwardly inclined apron 8. Said frame is supported by four floor-engaging legs 10 each secured to one corner thereof. Although not illustrated, it will be readily understood that said legs may be secured to said frame by readily detachable means, to permit easy disassembly thereof when desired.

The table base 2 described above supports a carriage designated generally by the numeral 12 at its top, for forward and rearward sliding movement relative to said table base. Said carriage comprises a pair of parallel angle-iron side bars 14 each embracing an outside top corner of the side reaches of said frame, extending both forwardly and rearwardly from said frame, and secured slidably in assembly therewith by keeper straps 16 welded to said frame. The rearward ends of bars 14 are rigidly connected by a horizontal transverse beam 18 extending therebetween and rigidly affixed thereto behind frame 4, and their forward ends are rigidly connected by a horizontal transverse beam 20 extending between and rigidly affixed thereto. Welded or otherwise affixed to the forward surface of beam 20 is a transversely extending plate 22, the plane of said plate being vertical. Plate 22 extends above said beam, and it is provided on its inner surface, above said beam, with a ledge 24 which supports the forward edge of a main table top slab 26. Said table top slab is preferably formed of wood or the like. The rearward edge portion of said slab, which is rectangular is supported by a horizontal shelf 28 to the lower surface of which is affixed a bracket 30 of inverted U-shape which engages slidably and downwardly over rear cross beam 18 of carriage 12. Table slab 26 is supported solely by shelf 28 and ledge 24, so as to move forwardly and rearwardly with carriage 12. It will be noted that shelf 28, at its rearward edge also forms a groove in which a fence member 58, also preferably formed of wood, may be carried, extending above the level of slab 26. This is a guide for work pieces, not directly pertinent to the present invention but useful in my co-pending application, Ser. No. 897,738, filed Apr. 19, 1978 now U.S. Pat. No. 4,181,057.

The carriage is moved forwardly and rearwardly by a horizontal push beam 32 fixed at its forward end to front carriage cross beam 20, as at 34, and extending rearwardly for sliding engagement in a tubular guide 36 which is fixed in apron 8 of the front leg of frame 4 and extends into the interior of the frame. A horizontal shaft 38 extends transversely through frame 4, extending through aprons 8 of the side frame legs to project externally of said frame, being journalled rotatably in bearing sleeves 40 affixed to said aprons, and is turned manually by operation of either of a pair of cranks 42 affixed respectively to the opposite ends thereof. Within the frame, a portion of shaft 38 is threaded to form a screw 44 (see FIGS. 1 and 3) on which is threaded a nut 46. Said nut is prevented from rotating by its sliding engagement with a fixed guide 48 parallel to the screw. Said nut is provided with a lateral horizontal extension 50, and said extension is pivotally connected by means of rigid links 52 with a lateral projection 54 of push beam 32, said projection being movable in a longitudinal slot 56 of tubular guide 36. Thus, by turning either of cranks 42 in one direction or the other, nut 46 will be moved along screw 44, and will react through links 52 and push beam 32 to move carriage 12 forwardly or rearwardly, with substantial force when necessary. The device may be termed a "screw jack".

Main table slab 26 is guided in its forward and rearward movement by the carriage, and prevented from shifting laterally, by means including a pair of parallel, transversely extending horizontal bars 60 disposed over the top of frame 4, but in slightly spaced apart relation below slab 26. These bars are positioned relative to the frame by pins 62 (see FIGS. 1, 2 and 8) affixed therein and insertable downwardly into holes provided therefor in top lips 6 of the front and rear frame legs, and releasably affixed thereto by latches 64 (see FIG. 1) which may be of any suitable type and are not here shown in detail. Bars 60 extend the full width of table top slab 26, and are affixed at each of their ends to a forwardly and rearwardly extending horizontal bar 66. Extending above each bar 66, parallel therewith, is a keeper bar 68. Each of said keeper bars is of angle iron form, having a leg abutting the associated side edge of slab 26 in sliding engagement therewith, and having a depending bracket 70 of inverted U-form affixed to the lower surface thereof and engaged slidably over the associated bar 66.

Said bracket is yieldably affixed to its bar 66 by a bolt 72 passing therethrough and through a longitudinally elongated slot 74 of its bar 66, and having a hand-operated clamp nut 76 threaded thereon. Thus, by loosening bolts 72, keeper bars 68 may be adjusted forwardly or rearwardly on bars 66. For reasons which will presently appear, they are intended for use only in their extreme forward positions, as shown in FIG. 1, in which they project well forwardly of table slab 26, or in their extreme rearward positions, as shown in FIG. 16, in which their length coincides with the front to rear dimension of table slab 26. Their movement is of course limited by the length of slots 74. Where necessary, as is the case with rear transverse bar 60, said cross bars may be offset downwardly adjacent bars 66, as indicated at 78, in order to permit the passage of brackets 78 thereover.

Keeper bars 68 may also be used to support a work guiding fence 80 in fixed relation to the table base. Said fence extends transversely across the table, and has a vertical face parallel with and confronting the forward edge of the main table slab. At one end, the left as shown, it is provided with a vertical pin 82 (See FIGS. 11 and 14) which may be inserted selectively downwardly through any one of a series of longitudinally spaced apart holes 84 formed in the top leg of left keeper bar 68, said pin being provided with a spacer 86 whereby fence 80 is held in slightly spaced apart relation above table slab 26, in order that said slab may be moved freely therebeneath by carriage 12. At its opposite end, the right as shown, fence 80 is affixed to a slide 88 mounted on and movable along right keeper bar 68. A screw 90 mounted in said slide and operable by a handle 92 is operable to enter any one of a series of longitudinally spaced apart holes 94 formed in a vertical leg of right keeper bar 68, whereby to secure the slide against movement along said bar. The spacing of holes 94 of course corresponds to the spacing of holes 84 of the left keeper bar. As a visual aid in positioning slide 88, the top reach of right bar 68 may have a small hole 96 formed therein in alignment with each of holes 94, and slide 88 may have a larger hole 98 formed therethrough through which holes 96 may be observed. By moving the slide to align hole 98 over the proper one of holes 96, assurance can be had that screw 90 is properly aligned with one of holes 94.

An auxiliary table designated generally by the numeral 100 is provided for attachment to the forward edge of carriage 12, more specifically to the forward surface of mounting plate 22 of the carriage. As shown, said auxiliary table is formed of sheet metal, and in its use as a table saw as illustrated in FIGS. 1-7, has a planar top wall 102 the upper surface of which is adapted to support work pieces. It is disposed at the forward edge of table slab 26 and carriage 12, and wall 102 thereof forms a coplanar extension of the top surface of slab 26. It is provided with depending side walls 104, and a horizontal transverse beam 106 extends between said side walls in spaced relation below top wall 102, being rigidly affixed to said side walls. The auxiliary table is detachably affixed to carriage 12 by a pair of headed lugs 108 affixed to beam 106 at spaced points therealong and projecting rearwardly for engagement each in a keyhole slot 110 formed therefor through front plate 22 and beam 20 of carriage 12. The head of each lug may be inserted rearwardly through the enlarged upper portion of its associated slot 110, and the connection secured by pressing the neck of the lug downwardly into the narrower lower portion of the slot. The auxiliary table will then be disposed in coplanar relation with the top surface of main table slab 26. It will be noted that top wall 102 of the auxiliary table is offset downwardly immediately adjacent slab 26 to form a groove 112 for supporting a protractor 114 as shown in FIGS. 21 and 22, which will be described more fully hereinbelow.

Top wall 102 of table 100 has a rectangular aperture 116 formed therein, and a saw carrier plate 118 is disposed in said aperture in coplanar relation with plate 102. Plate 118 has a width equal to the width of aperture 116, but is of lesser front-to-rear dimension, whereby to be movable forwardly and rearwardly therein. As best shown in FIGS. 3 and 4, plate 118 is supported for this movement by the sliding engagement of lugs 120 fixed to the bottom thereof with a pair of horizontal rods 122 extending horizontally beneath and affixed to plate 102, respectively adjacent the opposite edges of plate 118. Said plate may be affixed releasably at any position in its forward and rearward movement by means including an arm 124 affixed to the bottom thereof at each side thereof, and extending laterally outwardly therefrom beneath plate 102. The outer end of each of said arms is perforated to receive a vertical screw 126 loosely therein. The head of said screw is disposed slidably but non-rotatably in a front-to-rear extending guideway 128 affixed to the lower surface of plate 102, and a hand-operated nut 130 is threaded thereon beneath arm 124. By tightening said nuts, arms 124 are clamped between the nuts and guideways 128, so that plate 118 is secured against movement along rods 122.

Plate 118 has a rectangular aperture 132 formed therethrough, through which the circular blade 134, or other circular cutting tool, of a power saw designated generally by the numeral 136 projects upwardly in a normally vertical plane. Said power saw may be of the ordinary type which is normally hand-held, and includes a housing 138 having a hand grip 140, an electric motor 142 furnished with electric power by a flexible cable 144, and a blade guard 146 shrouding blade 134 but from which the blade projects in one direction as it is driven by motor 142. It will be seen in FIG. 1 that blade 134 is secured to the output spindle 148 of the device by a nut 150, and that it may readily be interchanged with edgers, groovers, shapers or other circular cutting tools of proper size. Blade guard 146 is of sufficient width to accomodate many different tools of these types. Electric power to motor 142 is controlled by a trigger-type electric switch 152 built into hand grip 140, and for the purposes of the present invention, this switch is provided with a lock button 154 which, when manually pressed, will hold the switch closed until intentionally released, as is well understood in the art.

Housing 138 of the power saw is carried by a generally planar base plate 156 which is applied directly to the bottom surface of plate 118, and which it will be understood is provided with a notch through which blade 134 projects, said notch registering with aperture 132 of plate 118. The base plate is releasably secured to plate 118 by a pair of headed pins 158 fixed in plate 118 (see FIG. 4) and extending downwardly therefrom for engagement respectively in a pair of keyhole slots 160 formed in the base plate. The larger ends of said keyhole slots may be applied over the heads of said pins, and the plates secured in assembly by sliding the base plate horizontally to engage the narrower ends of said keyhole slots around the necks of said headed pins. Accidental horizontal slippage of the base plate relative to plate 118 is prevented by a vertical set screw 162 (see FIG. 4) threaded in a bracket 164 affixed to the bottom of plate 118 and engageable in a socket 166 provided therefor in the base plate. The provision of said socket, and the forming of keyhole slots 160 for receiving headed pins 158, are the only modifications of most standard power saws required to accomodate them for use in the present device. Also referring to FIG. 4, the saw housing 138 is pivoted to the base plate at 168, this pivotal movement adjusting the distance blade 134 projects above the auxiliary table. This adjustment is fixed by a clamp screw 170 carried by the saw housing and engaging an arcuate slide segment 172 concentric with pivot 168 and connected at one end to base plate 156. Also, the mounting of the saw housing on said base plate normally includes means whereby the saw blade may be tilted laterally of itself relative to said base plate, as for use in performing miter cuts. However, these adjustments are standard and well known in the power saw art, and are not here shown in detail.

In the use of the device as a table saw, with the parts arranged and assembled as thus far described, a board or other work piece is laid on main table slab 26 so as to overlie also auxiliary table 100 far enough to be aligned with blade 134, and moved transversely of the table, using fence 80 as a guide, to cause said work piece to move over and be cut by the blade in a line parallel to the fence. The vertical adjustment of the blade, as provided by pivot 168, permits the blade projection to be adjusted to work pieces of different thicknesses. The work piece may be cut through, or only grooved, as when a dado cutter is substituted for blade 134 and its projection above the table is reduced to less than the thickness of the work piece. Miter cuts may also be made by tilting the blade transversely of its plane as already described.

The lateral spacing between fence 80 and blade 134, as required by the width of any work piece, may be adjusted by movement of said fence along keeper bars 68 and by movement of carriage 12 by screw jack 44. Coarse adjustments are made by moving fence member 80, by inserting its left pin 82 selectively in the desired hole 84 of left keeper bar 68, and by engaging right screw 90 thereof in the desired hole 94 of right keeper bar 68, as previously described. It will be apparent that when the keeper bars are set at their forward positions, as shown in FIG. 1, fence 80 may be moved forwardly to overlie the auxiliary table, virtually into the vertical plane of blade 134. The keeper bars are never set at any intermediate positions, since this could destroy the parallelism between the fence and the blade plane. However, movement of the fence as just described provides adjustment only in steps, and fine continuous adjustment is provided by turning either of cranks 42. This actuates screw jack 44 to move carriage 12 forwardly or rearwardly as previously described. This moves both main table slab 26 and auxiliary table 100, and of course the power saw carried by the latter, relative to fence 80, since they are mounted on and movable with the carriage, but does not move fence 80, which is supported directly by table base 2. This adjustment is infinitely continuous, and permits extremely accurate settings of the distance between the fence and the blade. The distance by which the carriage may be moved by the screw jack must of course be at least as great as the distance between any two successive settings of fence 80 relative to keeper bars 68. Continuous adjustment of the fence-blade spacing, with a limited range, may also be obtained by loosening nuts 130 and moving saw carrier plate 118 forwardly or rearwardly along rods 122, but this adjustment is intended primarily for use in the shaper application of the device, as will be described hereinbelow.

It is in connection with the table saw usage of the device, as just described, that the protractor 114 shown in FIGS. 21 and 22 is useful. Said protractor includes an elongated body member 174 of channel form and of a width to be engaged in and moved slidably along groove 112 of top wall 102 of the auxiliary table. Disposed above said body member is a semi-circular protractor member 176 the midpoint of the base leg of which is pivoted to the body member by a vertical bolt 178, and the curved portion of which carries a protractor scale 180 readable relative to a pointer 182 affixed to the body member. The protractor member may be releasably affixed at any desired angle to the body member by a clamp bolt 184. The base leg of the protractor member is provided with a vertical planar flange 186 which extends laterally of the body member at an angle thereto determined by the protractor setting. In use, as the body member is moved along groove 112, a work piece may be held firmly against flange 186, which acts as a guide, and moved over the auxiliary table to be cut by blade 134. In this manner, angled cuts at any predetermined angle may be made. If the work piece, due to its position, extends across main table slab 26, fences 80 and 58 may be removed to prevent interference thereby with movement of the work piece.

In the use of this device as a shaper, auxiliary table 100 is removed from carriage 12 by disengaging its lugs 108 from keyhole slots 110 of the carriage, and remounting it on the carriage as shown in FIG. 8, with top wall 102 thereof arranged vertically along the forward edge of table slab 26, and with blade 134 overhanging the forward edge portion of said slab. This remounting is accomplished by means of a second pair of lugs 188, similar to lugs 108, carried by top wall 102 of the auxiliary table and engageable in like manner in keyhole slots 110 of the carriage. Each of lugs 188, as best shown in FIG. 7, is normally recessed below the top surface of wall 102 in a hole 190 formed in said wall, and is affixed to the upper end of a hand-operated screw 192 threaded in a bracket 194 welded to the bottom of said wall. Lugs 188 are retracted below the top of the auxiliary table when the device is in use as a table saw, as shown in solid lines in FIG. 7, in order not to impede the movement of work pieces over said table, but may be extended, as shown in dotted lines, for engagement in carriage slots 110 as described. In the use of the device as a shaper, a work piece supported on main table slab 26, and guided for movement thereover by fence 80, presents an edge of itself to blade 134, and is formed thereby. It is used principally to "shape" an edge of a board, including such operations as edging, planing, grooving as by a saw or dado cutter, and shaping to decorative contours by specially formed circular cutters. It will be understood that cutting tools specific to any one of these operations may be interchanged with blade 134. All other operations and adjustments are similar to those described in connection with the table saw usage, except of course that the adjustable movement of saw carrier plate 118 along rods 122 of the auxiliary table now serves to adjust the elevation of blade 134 relative to main table slab 26, and hence relative to a work piece supported by said slab.

FIGS. 16–20 show the use of the device as a bench vise. In this case, auxiliary table 100 is disconnected from carriage 12 and set aside, and a vise jaw 196, formed preferably of wood, is affixed to the forward surface of carriage plate 22 by lugs 198 similar in all pertinent respects to lugs 108, and similarly engageable in keyhole slots 110 of the carriage. At each side of top frame 4 of table base 2 there is affixed as by welding a horizontal sleeve 200 extending from front to rear. Each of said sleeves is capable of receiving detachably a tubular bracket 202 including a horizontal leg 204 insertable rearwardly into said sleeve and fixable therein by a pin 206 insertable through matching holes thereof. At the forward end of leg 204, it is bent downwardly to form a generally vertical leg 208, then rebent upwardly in U-form to form a generally vertical leg 210, all as best shown in FIG. 16. A transversely extending vise plate 212, confronting and generally coextensive with front carriage plate 22, is carried at the upper ends of bracket legs 210, having affixed thereto a pair of tubular sockets 214 each engageable downwardly and slidably over the upper end portion of one of bracket legs 210. The face of plate 212 confronting jaw 196 is also equipped with a jaw 216 releasably affixed thereto by headed lugs 218 engageable in keyhole slots 220 of said plate, in the same manner as jaw 196 is joined to plate 22.

A work supporting cradle 222 is disposed between the vertical legs 208–210 of each bracket 202. Each of said cradles is affixed to a sleeve 224 mounted for sliding movement along leg 210, and adjustably fixed thereon by a clamp bolt 226 which is movable, when loosened, through a slot 228 formed longitudinally in said bracket leg, whereby the elevation of the cradles relative to the vise jaws may be adjusted.

In operation of the vise, jaws 196 and 216 are separated by turning either of cranks 42 to operate screw jack 44 to move carriage 12 and jaw 196 carried thereby to the rear. A work piece is then positioned between the jaws to rest in cradles 222, which are adjusted to the proper elevation to support the upper edge of the work piece above the jaws. The vise is then tightened by operating screw jack 44 to move jaw 196 forwardly, thereby gripping the work piece against fixed jaw 216. Generally, the vise is used to hold work pieces fixed and steady while performing operations thereon by means of hand-held tools, but it is of course capable of performing virtually any function of bench vises in general.

While I have shown and described a specific embodiment of my invention, it will be readily apparent that many minor changes of structure and operation thereof could be made without departing from the spirit of the invention.

What I claim as new and desire to protect by Letters Patent is:

1. A combination table saw and shaper comprising:
    a. a table base,
    b. a main table top,
    c. means supporting said main table top on said table base,
    d. an auxiliary table having a planar top surface with an aperture formed therein,
    e. a power saw mounted on said auxiliary table beneath said aperture and having a circular blade driven thereby and partially projecting above said planar top surface through said aperture, and
    f. means operable to mount said auxiliary table on said table base selectively either in a first position in which the top surface thereof forms a coplanar extension of said main table top at the forward edge of the latter, with said blade projecting upwardly therefrom in a plane parallel to said forward edge, or in a second position in which the previously top surface thereof rises vertically from the forward edge of said main table top and said blade projects horizontally rearwardly over the forward edge portion of said main table top.

2. The combination as recited in claim 1 wherein said power saw is mounted on said auxiliary table by means operable to permit adjustable movement of the blade thereof, relative to said auxiliary table, in a direction transverse to the edge of said auxiliary table which abuts the forward edge of said main table top when the former is in said first position thereof, whereby to adjust the elevation of said blade above said main table top when said auxiliary table is disposed in said second position thereof.

3. The combination as recited in claim 2 including a fence member extending transversely across said main table top in parallel relation to the forward edge thereof, along which a work piece may be guided for presentation to said blade, whereby said adjustability of said power saw relative to said auxiliary table permits adjustment of the lateral horizontal distance between said fence member and said blade when said auxiliary table is in said first position thereof.

4. The combination as recited in claim 1 wherein said means supporting said main table top on said table base comprises a carriage mounted movably on said table base for horizontal movement transverse to the forward edge of said main table top, and with the addition of manual operating means carried by said table base for moving said carriage, said main table top being supported by said carriage for movement therewith, and said auxiliary table also being mountable on said carriage in either its first or second positions.

5. The combination as recited in claim 4 wherein said operating means comprises a screw jack providing infinitely variable adjustment of said carriage.

6. The combination as recited in claim 4 wherein said operating means constitutes a screw jack comprising:
 a. a transverse horizontal screw carried by said table base for rotation by manual means,
 b. a nut threaded on said screw but secured against rotation therewith, and
 c. a diagonally extending rigid link pivoted at one end to said nut and at its opposite end to said carriage.

7. The combination as recited in claim 4 including a fence member extending across said main table top, parallel to the forward edge thereof, and means carried by said table base for supporting said fence member in slightly spaced apart relation above said main table top, whereby said main table may move freely therebeneath, whereby said operating means is operable to adjust the horizontally transverse distance between said fence member and said blade when said auxiliary table is mounted on said carriage in said first position.

8. The combination as recited in claim 7 wherein said means for supporting said fence member comprises a pair of horizontal keeper bars carried by said table base and extending along the respectively opposite side edges of said main table top whereby to guide the latter in its forward and rearward movement by said carriage, the respectively opposite ends of said fence member being secured respectively to said keeper bars.

9. The combination as recited in claim 8 including means whereby each end of said fence member may be connected to its associated keeper bar selectively at any one of a series of longitudinally spaced apart points of said bar, in order to provide a stepped adjustment of the spacing between said fence member and said blade, said operating means providing infinitely variable adjustment of said carriage at least as great in total extent as the distance between successive points of attachment of said fence member to said keeper bars.

10. The combination as recited in claim 9 wherein said keeper bars are carried by said table base for forward and rearward longitudinal movement, either to a rearward position in which their forward ends do not extend forwardly of said main table top, or to a forward position in which their forward ends project forwardly of said main table top substantially to the vertical plane of the blade carried by said auxiliary table.

11. The combination as recited in claim 1 wherein the top surface of said auxiliary table, when in said first position, has a groove formed therein extending parallel to the forward edge of said main table top and the vertical plane of said blade, and with the addition of a protractor device comprising:
 a. an elongated body member slidably engageable in said groove,
 b. a protractor pivoted to said body member on a vertical axis to overlie the top surfaces of said main and auxiliary table tops, and having an upstanding planar flange, and
 c. clamp means operable to affix said protractor to said body member to secure said flange at any desired transverse angle to said body member, said flange serving as a support against which a work piece may be held and thereby moved in operating relation to said blade as said body member slides along said groove.

* * * * *